(12) United States Patent
Serkiz et al.

(10) Patent No.: US 6,560,920 B1
(45) Date of Patent: May 13, 2003

(54) SOIL REMEDIATION BY COUPLED PHYTOEXTRACTION/BIOGEOCHEMICAL TREATMENT

(75) Inventors: Steven M. Serkiz, Aiken, SC (US); Robert F. Blundy, Lexington, SC (US)

(73) Assignee: Westinghouse Savannah River Company, L.L.C., Aiken, SC (US)

( * ) Notice: Subject to any disclaimer, the term of this patent is extended or adjusted under 35 U.S.C. 154(b) by 10 days.

(21) Appl. No.: 09/676,198

(22) Filed: Sep. 29, 2000

(51) Int. Cl.⁷ .......................... A01B 79/00; A01C 1/00; A01G 1/00; A01H 3/00
(52) U.S. Cl. ....................................... 47/58.1
(58) Field of Search ......................... 47/58.1

(56) References Cited

U.S. PATENT DOCUMENTS

| | | | |
|---|---|---|---|
| 5,141,362 A | * | 8/1992 | Kugler |
| 5,364,451 A | | 11/1994 | Raskin et al. |
| 5,668,294 A | | 9/1997 | Meagher et al. |
| 5,700,107 A | | 12/1997 | Newton |
| 5,711,784 A | | 1/1998 | Chaney et al. |
| 5,720,130 A | | 2/1998 | Bost |
| 5,728,300 A | | 3/1998 | Kapulnik et al. |
| 5,785,735 A | | 7/1998 | Raskin et al. |
| 5,809,693 A | | 9/1998 | Chet et al. |
| 5,829,191 A | | 11/1998 | Gatliff |
| 5,829,192 A | | 11/1998 | Gatliff |
| 5,846,821 A | | 12/1998 | Guerinot et al. |
| 5,853,576 A | | 12/1998 | Kapulnik et al. |
| 5,863,433 A | | 1/1999 | Behrends |
| 5,876,484 A | | 3/1999 | Raskin et al. |
| 5,877,164 A | | 3/1999 | O'Neill et al. |
| 5,917,117 A | | 6/1999 | Ensley et al. |
| 5,927,005 A | | 7/1999 | Gardea-Torresdey et al. |
| 5,928,406 A | | 7/1999 | Salt et al. |
| 5,944,872 A | | 8/1999 | Chaney et al. |
| 5,947,041 A | | 9/1999 | Licht |

OTHER PUBLICATIONS

United States Environmental Protection Agency, Report 542–F–98–011, Aug. 1998, "A Cititzen's Guide to Phytoremediation".*

EPO, International Search Report, PCT/IS01/29843, pp. 1–3. Mar. 26, 2002; The Netherlands.

Cunningham et al, "Remediation of Contaminated Soils and Sludges by Green Plants," Bioremediation of Inorganics. San Diego, Apr. 1995, International In Situ and On–Site Bioreclamation Symposium, Battelle Press, vol. 3 (10) Symp. 3, pp 33–54, Apr. 1, 1995, United States.

* cited by examiner

Primary Examiner—Bruce R. Campell
Assistant Examiner—Susan B. McCormick
(74) Attorney, Agent, or Firm—Dority & Manning, PA

(57) ABSTRACT

A process of phytoremediation is provided in which the above-ground surface is first amended with stabilizing additives which will react with and bind subsurface contaminants. As the contaminants are brought to the surface through the growth of phytoextracting plants, the plants' vegetation is left to die in situ. As the plant biomass decomposes, the soil contaminants brought to the surface react with and/or are bound by the soil amendments. The soil amendments may further be provided in the form of a geotextile barrier or mat having one or more additive layers present within the mat structure.

13 Claims, 3 Drawing Sheets

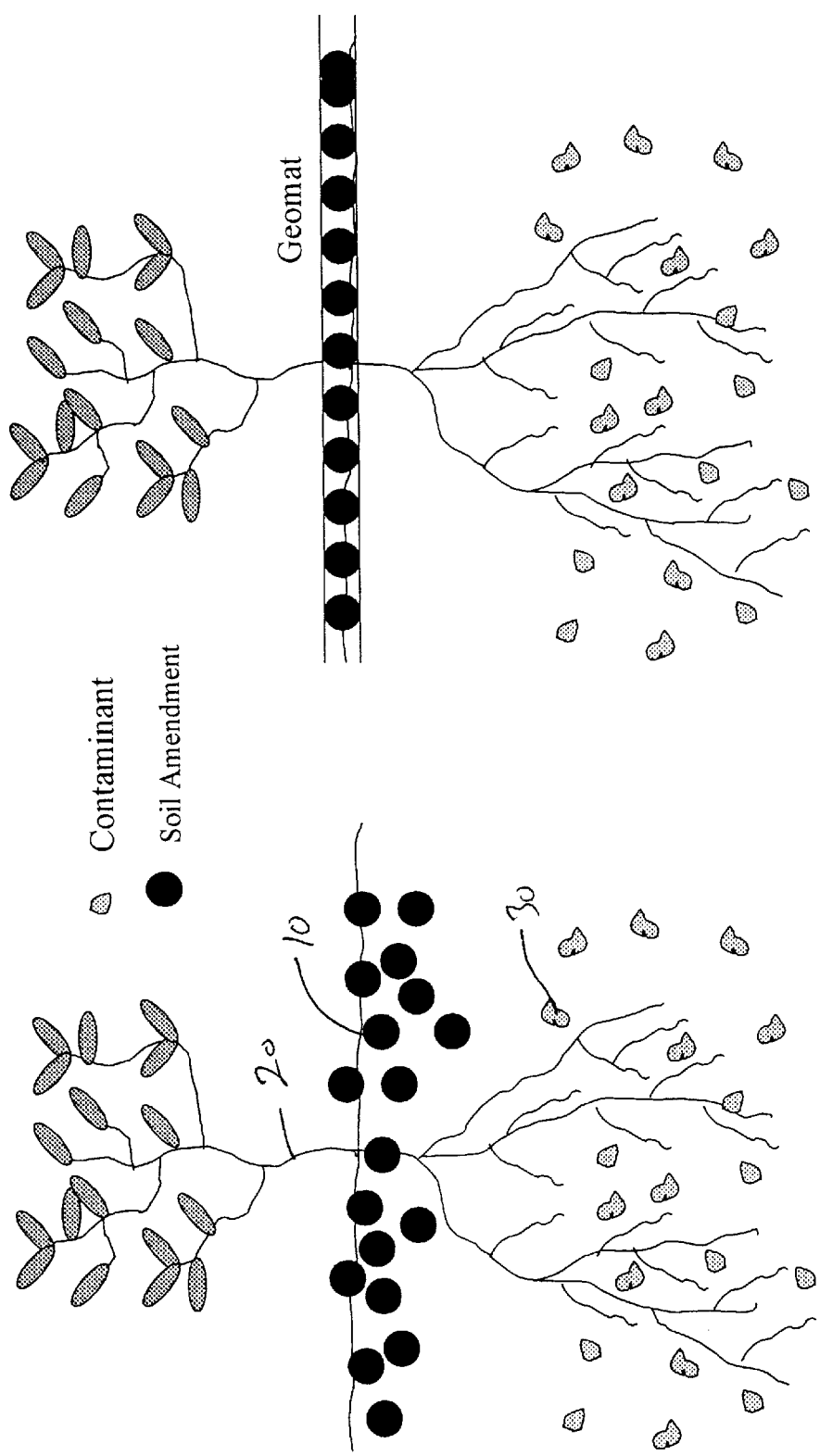

SOIL REMEDIATION BY COUPLED PHYTOEXTRACTION/BIOGEOCHEMICAL TREATMENT

FIELD OF THE INVENTION

The present invention generally relates to a phytoremediation process for removing shallow subsurface contaminants in soils. More particularly, the present invention provides a process which combines surface chemical reaction (i.e., fixation and degradation) of contaminants with the phytoextraction and subsequent accumulation of contaminants in the above-ground biomass of the plants. In particular, a combination of phytoextraction and surface chemical reaction is provided which allows passive remediation over numerous plant growth cycles to occur without the expense of above-ground biomass removal and disposal.

BACKGROUND OF THE INVENTION

Phytoextraction is a recognized method of reducing soil contamination. Phytoextraction refers to a natural growth process in which soil minerals and ions are actively accumulated within plant tissues at concentrations greater than that accountable by simple concentration gradients. Accordingly, some form of active transport occurs where roots accumulate organic and inorganic compounds through normal metabolic pathways. Certain species (hyperaccumulators) of plants show high affinity for select minerals or ions. Such species have been used in soil remediation efforts in which phytoaccumulating plants are grown in contaminated soil.

One such method, disclosed in U.S. Pat. No. 5,720,130 to Bost, and which is incorporated herein by reference, teaches that selected plants may accumulate metals, metal salts, nonmetals, and organic waste which migrate from the roots and into the above-ground parts of the plant. Thereafter, the plants are harvested and the contaminated plant material removed.

It is also known to increase the rate of phytoaccumulation within select plants by the addition of soil amendments. One such method is taught in U.S. Pat. No. 5,711,784 to Chaney et al., which is incorporated herein by reference. In Chaney et al., the soil amendments are added to promote the uptake by the plants of selected contaminants. Thereafter, the above-ground biomass of the plants is harvested, removed, and disposed of as a hazardous material.

Currently, a need exists for a phytoremediation process which avoids the cost and expense of harvesting and disposing of above-ground biomass. Also is protective of or less disruptive to sensitive ecosystems, i.e., wetlands. In particular, there exists a need for a phytoextraction and accumulation process which allows repeated growth cycles of the phyotaccumulating plants to occur and in which the dead or harvested biomass may be left in place.

SUMMARY OF THE INVENTION

It is an object of the present invention to provide an improved phytoextraction/chemical fixation process for use in remediation of shallow soil contaminants.

Another object of the present invention is provide a phytoaccumulation process in which senescent biomass may be left in place without further migration of the contaminants.

It is yet another object of the present invention to provide a treatment process for contaminants which includes undergoing degradation following chemical fixation. In other words, organic compounds such as PCBs and TNT may be chemically fixed by the phytoaccumulation process and then subject to a specific [microbial] degradation by the introduction of suitable biological amendments.

These and other objects of the present invention are achieved by a process of providing a chemically and physically stabilized amendment layer along an upper soil surface. Following the amendment of the top soil layer, phytoextracting plants along with indigenous plants are introduced into the soil region within the contaminated site. As the plants grow, the plants extract and accumulate contaminants which are transported, in part, to the above-ground portions of the plant. The plants, particularly if annuals, may remain in situ without further handling and the natural senescence process may proceed undisturbed. Alternatively, and depending upon the accumulated contaminant, the plants may be harvested, i.e., cut, up-rooted, treated with herbicides, or subjected to a prescribed burn. In all cases, the plant material harvested remains at the original growth site.

The upper soil surface amendments provide a stabilizing layer for the contaminants in the above-ground biomass. Repeated growth cycles may occur naturally or through re-seeding or otherwise repopulating the growth site. The cycle(s) may be repeated as needed until the subsurface contaminant concentrations have been reduced to acceptable levels.

Thereafter, the amended soil layer and contaminated biomass may be removed for disposal. Alternatively, if the chemically fixed contaminants are sufficiently stable, the plant biomass, accumulated contaminants and the amended soil layer may be left in situ or capped with an additional layer of amended soil or barrier mats. Additionally, a biologically active agent such as specific bacteria may form part of the amendments so as to provide a biological degradation of any contaminants.

In general, any application which makes use of phytoextraction as a treatment protocol for shallow surface contaminants, may be used in conjunction with a stabilized upper surface soil layer which may be provided by soil amendments and/or prepared barrier mats designed to react and/or chemically fixate the contaminants upon contact. In some embodiments, the phytoextracting plants may be left undisturbed to undergo natural growth and senescence cycles. In other embodiments, the above-ground biomass may be removed at ground level but otherwise left in place. In yet another embodiment, the stabilized soil amendments provides a permanent treatment protocol for all contaminants brought to the upper surface level by the phytoaccumulating plants. In yet another embodiment, once the inorganic or organic contaminants have been brought to the upper surface, the amended soil layers and accumulated biomass from the phytoaccumulators may be removed for subsequent treatment or disposal.

Other objects, features and aspects, of the present invention are discussed in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 2 is an embodiment of an alternative process, in which an amended upper soil layer is applied directly to the soil and in conjunction with a phytoextracting plant.

FIG. 3 illustrates an alternative embodiment of using a geotextile amendment containing a layer to provide a modified soil surface layer useful in carrying out a phytoextraction or immobilization process.

Figures 1A, 1B:
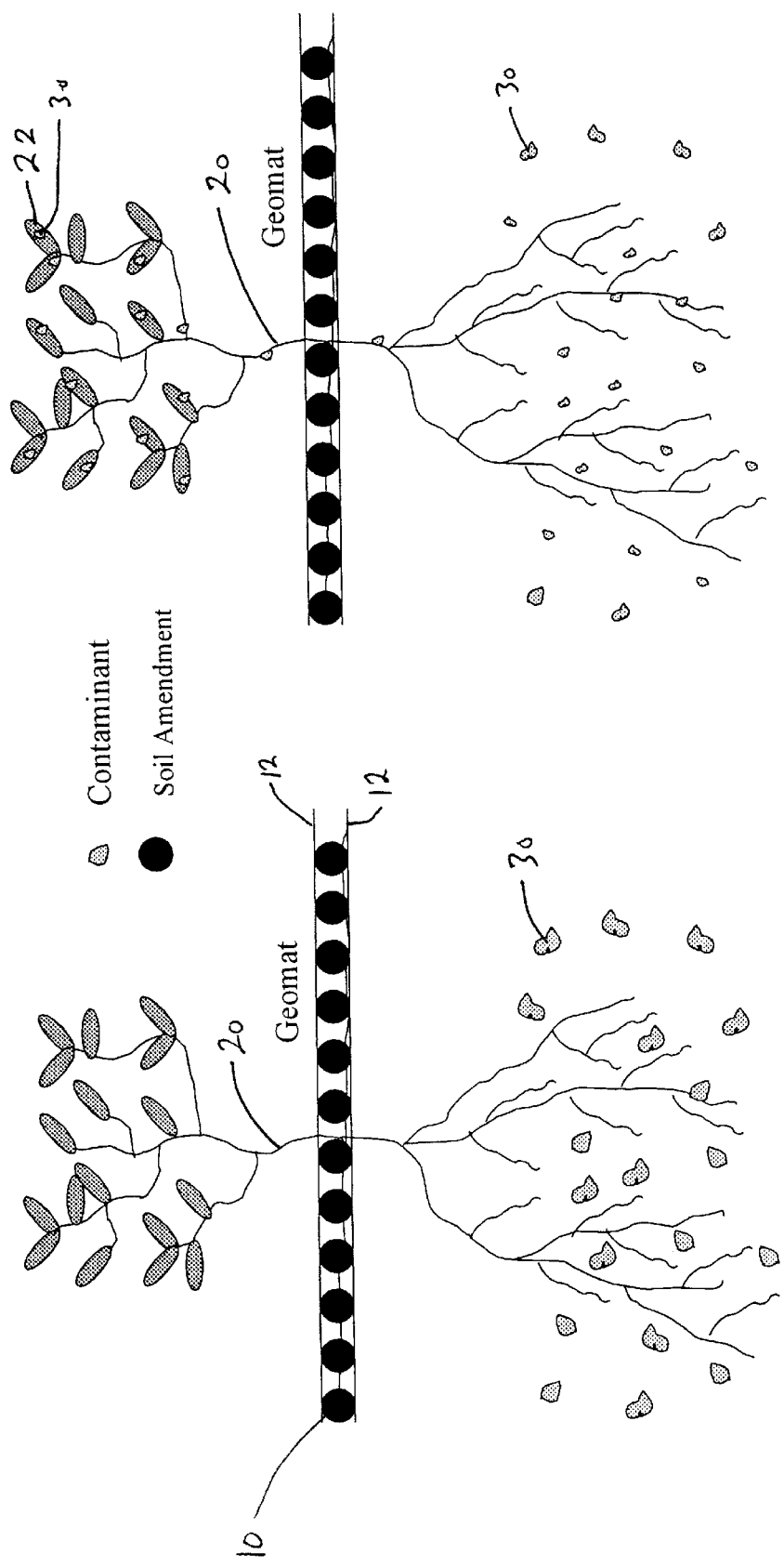
FIG. 1A is a schematic view of a first embodiment of a geotextile mat providing an amended upper soil layer in conjunction with a phytoextracting plant.
FIG. 1B is a schematic view similar to FIG. 1A illustrating the translocation of soil contaminants to the plant leaves and other tissues.

Repeat use of reference characters in the present specification and drawings is intended to represent the same or analogous features or elements of the invention.

DETAILED DESCRIPTION OF THE REPRESENTATIVE EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention, which broader aspects are embodied in the exemplary constructions.

In general, the present invention is directed to a process of phytoremediation of shallow subsurface contaminants. The process includes incorporating an amended soil layer or a reactive barrier layer to the preexisting top soil to form a new upper surface layer above the contaminated zone. Thereafter, the phytoextracting plants or appropriate indigenous plant species are introduced onto the treatment site. As the below ground portions of the plant make contact with the contaminated soil, the roots and subsurface portions of the plant extract and accumulate contaminants that are subsequently accumulated within the plant tissue. The phytoaccumulating plants preferentially translocate the contaminants to the above-ground portions of the plant. Thereafter, the above-ground portions may be cut and left in place (i.e., in situ) or the plant may be allowed to undergo a natural growth and senescence cycle over multiple seasons.

As best seen in reference in FIGS. 1A–1D, a sequential process is illustrated in which a soil amendment 10 is contained between opposing layers of a geotextile fabric 12 and referred to generally as a geomat. A phytoaccumulating plant 20 is introduced to the site where contaminants 30 are present. As seen in reference to FIG. 1B, the phytoaccumulating plant 20 accumulates contaminants 30 in leaves 22 and in other plant tissues.

Figures 1C, 1D:
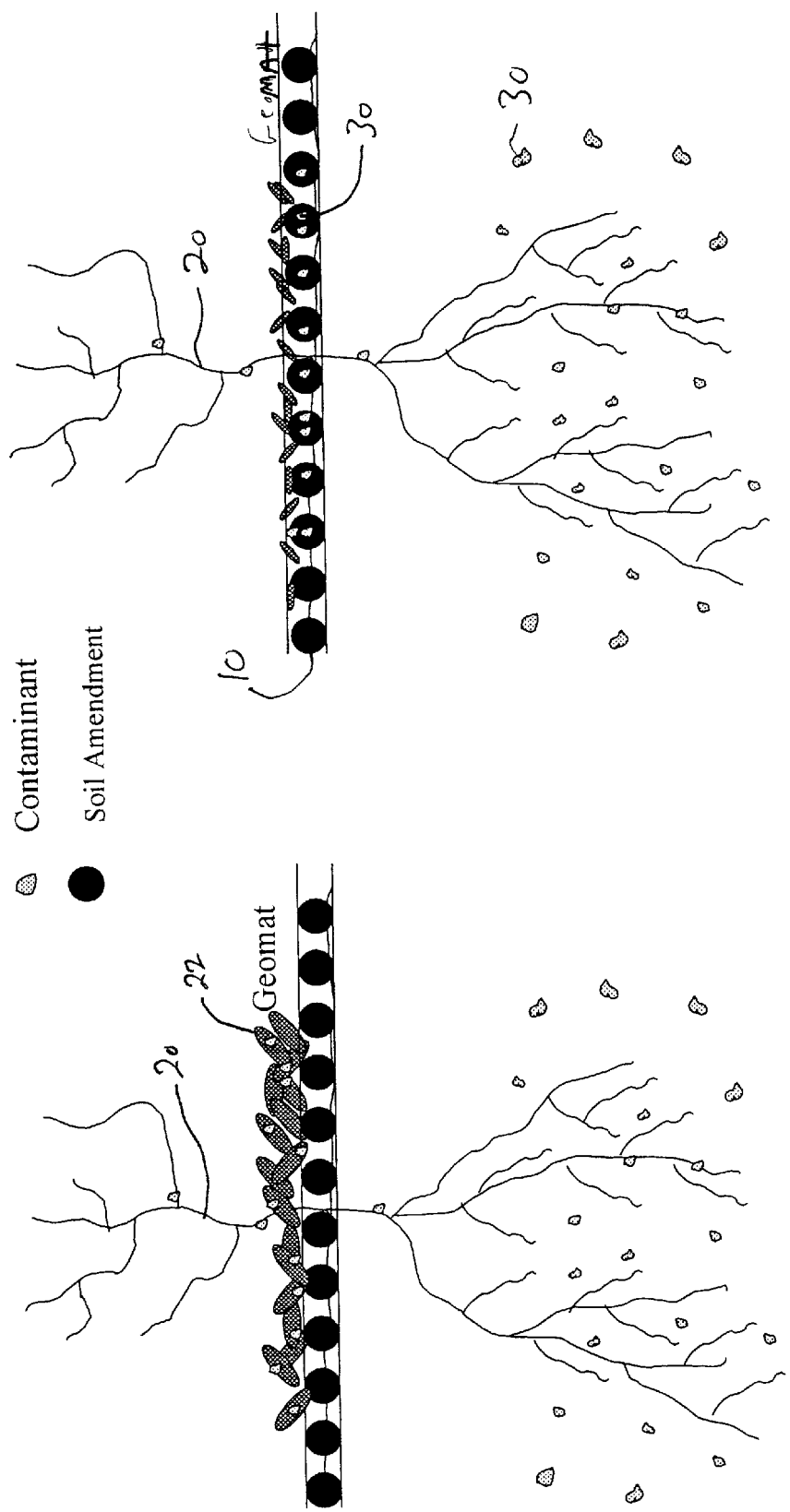
FIG. 1C is a schematic view of a further progression of the phytoimmobilization process in which leaves having contaminants accumulate on the surface of the geotextile containing soil amendments.
FIG. 1D further illustrates a degradation process in which the decomposition of the fallen leaves allows the contaminants to interact with the soil amendment contained within the geotextile.

As best seen in reference to FIG. 1C, the leaves 22 may be removed from plants 20 through a natural senescence process or through the application of a herbicide or defoliant. The leaves 22 accumulate on the surface of the geomat and, as seen in reference to FIG. 1D, undergo a degradation process. The contaminant 30 remaining in leaves 22 is subsequently released and will interact with the soil amendment 10 present within the geomat. The soil amendment 10 may further include a biological agent, such as bacteria, designed to metabolize certain contaminants. In this manner, it is possible to both immobilize and/or subsequently degrade contaminants which interact with the soil amendment.

As seen in reference to FIG. 2, the initial stage of a phytoimmobilization or phytoextraction process may introduce the soil amendments 10 directly to the soil. Thereafter, plants 20 may be planted or introduced by seeding to the contaminant site having the soil amendments. Thereafter, the normal growth cycle of the plant continues in a process similar to that set forth in FIGS. 1A–1D, providing the soil amendment an opportunity to bind to the contaminant 30. Alternatively, the initial soil amendments may be introduced as a geomat as set forth in FIG. 3.

In either event, contaminants 30 from the vegetation, plant litter, detritus, and other organic plant-derived biomass from the phytoextracting plants will be retained within the upper amended surface layer. Upon completion of the phytoremediation process, the amended layer may be left in place or removed for subsequent treatment and/or disposal. A process of the present invention can generally be carried out by any phytoextraction plant species as are known in the art. For instance, members of the plant family Brassicaceae are well known for absorbing metals into their roots and transferring the metals into the above-ground portions of the plant. The selection of the appropriate species can be varied depending upon the contaminant's character and speciation, geographical location, local soil environment, and other climate considerations.

Prior to the introduction of the phytoextracting plants, or utilization of appropriate indigenous plant species, the upper soil layer is treated with soil amendments that are designed to bind, immobilize, degrade and/or chemically fix the pollutants of interest. A variety of soil amendment processes are known. One suitable soil amendment can be prepared having the reactive amendments of a stabilizing backfill such as taught in the commonly assigned U.S. Pat. No. 6,284,681 to Langton which is incorporated herein by reference. In addition, selected biological agents may be added to the amendments to target specific contaminants.

Preferably at least one active layer or zone is established within the upper amended soil region. The active layer or material may be comprised of many different substances as long as one reactive agent is included. Some of the reactive agents that may be included are ion exchange resins, zeolite (natural and synthetic), clays, modified clays, cements, reducing agents, reactive blast furnace slag, reagent chemicals, sodium titanate, phosphate containing minerals, sulphur containing minerals, amorphous silica, amorphous alumina, calcium hydroxide, kiln dust, and surface active refractories. Certain non-reactive additives may be included as fillers, extenders, or binders including sands, fly ashes, synthetic fibers, kiln dust, and crushed lightweight aggregates. Several reactive agents may be mixed in the active layer or may be separated into distinct layers.

Depending upon the amount of clay and other compactable material included in the soil amendment, the amended layer can be compressed to control the amount of water percolation or movement into the subsoil. Generally, however, high percolation rates through the amendment layer are beneficial for this application.

As seen in reference to FIG. 2, an alternative embodiment of the present invention makes use of a multi-layer barrier mat which is deployed along the upper surface of the soil. The barrier may be prepared as set forth in the above referenced and incorporated patent application. For instance, one suitable barrier mat may be provided by one or more layers of a barrier mat constructed with a layer of a reactive material selected for a particular waste contaminant. As used herein, "layer" may mean one or more identifiable strata within the mat. Alternatively, the term "layer" also encompasses a portion of a mat including the reactive material and any intermixed materials or fillers. For instance, an existing bentonite mat or geotextile fabric may be modified in accordance with this invention by mixing a reactive material with the existing bentonite or sandwiching the reactive material between two geotextile webs. The resulting materials therefore comprise a layer of reactive material.

The reactive mats may be provided in the form of long, continuous rolls which are cut to size. Such mats have sufficient flexibility that they may conform to contours of a placement surface. Any of the reactive materials referenced herein may be added as a layer within a bentonite or geotextile-type mat. Such mats maintain their useful characteristics of flexibility and may be easily constructed using traditional mat-forming techniques. Such mats may be stacked with or without intervening filler layers, and mats having different reactive materials may be used together in a single application.

An additional embodiment may provide multiple reactive layers within a mat. The multiple active layers should include at least one reactive agent which is selected to stabilize and/or immobilize a specific hazardous or radioactive material. The active layer can be comprised of many different substances as long as one reactive agent is included. Some of the reactive agents that may be included are ion exchange resins, zeolite (natural and synthetic), clays, modified clays, cements, reducing agents, reactive blast furnace slag, reagent chemicals, sodium titanate, magnesium phosphate, amorphous silica, amorphous alumina, calcium hydroxide, kiln dust, and surface active refractories. Reactive agents may also include the introduction of biologically active organisms such as sulfate reducing bacteria which are known to reduce inorganic heavy metals to an insoluble metal sulfide. It is also known that organic contaminants such as TNT may be treated with a mineralizing microbe. Likewise, PCBs may also be subject to degradation through the use of specific microbial agents. Accordingly, the biologically active agents may serve as reactive amendments as utilized in the present invention. The non-reactive parts of the active layer are materials well known in the art, including sands, fly ashes, synthetic fibers, kiln dust, and crushed lightweight aggregates. Several reactive agents may be mixed in the active layer or may be separated into distinct layers. The active layers may be separated from one another by a barrier material, provided sufficient openings are provided for the growth of the phytoextracting plants.

The active layer reactive agents and amounts should be chosen carefully based on the hazardous or radioactive material and quantity which will be introduced by the phytoextracting plants over the entire course of treatment. For example, ion exchange resins and zeolite should be chosen to effectively stabilize certain hazardous or radioactive metal ions. Reducing agents and blast furnace slag can effectively stabilize chromium species. Clay materials, such as bentonite, can reduce the permeability of the reactive multi-layer composite mats 10, and some clays, such as attapulgite or illitic clays, can stabilize some cations such as cesium and strontium. The other amendment agents stabilize the hazardous materials by, for example, pH/Eh adjustment, precipitation, co-precipitation, solid solution formation, adsorption, and ion exchange. Materials, such as zero valent iron, sodium dithionite, and lime are but some examples of useful amendments. The active layers may also include stabilizing materials, fillers, and functional fillers. The use of fillers such as sand or gravel can be used to control the permeability of the layer.

The amount of reactive agent that should be added to the amended soil layers or barrier mats varies greatly. The type and specific amount of reactive agent required in the active layers depends upon the targeted hazardous or radioactive material. Barriers typically can contain approximately 5 to 50 weight percent of the reactive agents. The amount depends on the volume, the type, and concentration of the hazardous material.

As seen in reference to FIGS. 1 and 2, the phytoremediation foliage plants grow through the amended soil or protective barrier mat. The plants' roots extend into the contaminated subsurface where the contaminants are accumulated within the plant tissues. Particularly useful with the present invention is the use of phytoaccumulating plants which preferentially transfer the contaminating materials to the above-surface parts of the plant. Once accumulated, the plants may be periodically harvested to stimulate additional growth. When so treated, the pruned or cut plant tissue may be left in place along with the amended soil layer or barrier layer. As the normal decay processes proceed, contaminants present within the leaf litter, detritus, or plant residue will bind to and become immobilized/chemically fixed within the amended soil or barrier layer.

Since the present process requires no specialized harvest and removal, it is possible to plant several different species of phytoaccumulators within a single area. Such an ability is not possible in the conventional phytoaccumulation treatment methods where the entire region must be harvested and removed. In such usage, mixed crops would interfere with the harvesting in that the timing and compatibility of the different plants could interfere with the removal of the various harvest.

As a result, the ability to grow multiple species of phytoaccumulators within a single contaminated region allows a more aggressive and diverse treatment protocol. By placing appropriate soil amendments and/or barrier layers within the upper soil region, phytoaccumulators specific for different contaminants may be grown side by side allowing the simultaneous treatment of multiple contaminants.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

That which is claimed is:

1. A method of removing an organic or inorganic contaminant from a soil environment comprising:

identifying a contaminant contained within the soil environment;

amending the upper soil environment with chemical and physical stabilizers which react with the contaminant to form an insoluble and/or stable compound;

growing a plurality of phytoextracting plants wherein the roots of the plants are in contact with the contaminant;

allowing the above-ground portions of the plant to die;

contacting the above ground portions of the plants with the amended upper soil environment;

stabilizing the contaminants within the amended soil; and, removing the amended upper soil environment containing the stabilized contaminants.

2. The method according to claim 1 wherein said step of growing a plurality of phytoaccumulating plants further comprises growing a plurality of different species of phytoaccumulating plants.

3. The process according to claim 1 wherein said step of allowing the above-ground portions of the plant to die further includes process steps selected from the group consisting of herbicide treatment, defoliation, burning, and uprooting.

4. The method according to claim 1 wherein said step of amending the upper soil environment further includes providing a reactive barrier mat to form an upper soil environment.

5. The method according to claim 1 wherein said step of allowing the above-ground portions of the plant to die further include a natural plant senescence cycle.

6. The method according to claim 1 wherein said step of amending the upper soil environment further includes providing a biologically active agent for metabolic degradation of an organic contaminant within the amended soil.

7. A method of immobilizing a contaminant from a soil environment comprising:

identifying a contaminant contained within the soil environment;

amending an upper soil environment with a stabilizer, the stabilizer being reactive with the contaminant to immobilize the contaminant;

growing a plurality of phytoextracting plants, a root system of the phytoextracting plants being in contact with the subsurface environment and the contaminant; and, contacting the above ground portions of the plants with the amended upper soil, wherein contaminants released from the above ground plant portions react with said stabilizer and are immobilized within the upper soil environment.

8. The method according to claim 7 wherein the step of growing a plurality of phytoaccumulating plants further comprises growing at least two different species of phytoaccumulating plants.

9. The process according to claim 7 wherein the step of contacting the above ground portions of the plant with the amended upper soil further includes a step selected from the group consisting of a herbicide treatment, defoliation, burning, uprooting, and senescence.

10. The method according to claim 7 wherein the step of amending the upper soil environment comprises providing a reactive barrier mat within the upper soil environment.

11. The method according to claim 10 wherein said step of amending the soil environment consists essentially of providing a reactive barrier mat along a top surface of the soil.

12. The method according to claim 7 wherein said step of amending the upper soil environment further includes providing a biologically active organism for metabolic degradation of an organic contaminant contacted with the amended soil.

13. A method of phytoremediation comprising:

providing an amended soil environment as an upper soil layer;

growing a plurality of phytoaccumulating plants, said phytoaccumulating plants having above ground portions carried above said upper soil layer;

removing a subsurface contaminant by accumulating the contaminant into a tissue region of the phytoaccumulating plants;

contacting at least the above ground portion of the phytoaccumulating plant with the upper soil layer;

releasing a removed subsurface contaminant from the above ground portion of the plant; and, stabilizing the removed subsurface contaminant within the upper soil layer.

\* \* \* \* \*